US00RE48256E

(19) United States
(12) Reissued Patent
Revenew

(10) Patent Number: US RE48,256 E
(45) Date of Reissued Patent: Oct. 13, 2020

(54) BRIDGE ASSEMBLY AND METHOD

(71) Applicant: Patrick Revenew, Rochester, NY (US)

(72) Inventor: Patrick Revenew, Rochester, NY (US)

(21) Appl. No.: 16/548,523

(22) Filed: Aug. 22, 2019

Related U.S. Patent Documents

Reissue of:
(64) Patent No.: 9,739,022
Issued: Aug. 22, 2017
Appl. No.: 15/581,789
Filed: Apr. 28, 2017

U.S. Applications:
(63) Continuation of application No. 14/714,461, filed on May 18, 2015, now abandoned.

(51) Int. Cl.

| | |
|---|---|
| ***E01D 21/00*** | (2006.01) |
| ***E01D 2/02*** | (2006.01) |
| ***E01D 2/00*** | (2006.01) |
| ***E01D 19/12*** | (2006.01) |
| ***E01D 19/00*** | (2006.01) |
| ***E01D 101/30*** | (2006.01) |
| ***E01D 15/133*** | (2006.01) |

(52) U.S. Cl.
CPC ..... *E01D 21/00* (2013.01); *E01D 2/00* (2013.01); *E01D 2/02* (2013.01); *E01D 15/133* (2013.01); *E01D 19/00* (2013.01); *E01D 19/125* (2013.01); *E01D 2101/30* (2013.01)

(58) Field of Classification Search
CPC ..... E01D 19/00; E01D 2/02; E01D 21/00; E01D 15/133; E01D 2/00; E01D 19/125; E01D 2101/30
USPC ..... 14/73, 74, 4.5, 77.1, 78
See application file for complete search history.

(56) References Cited

U.S. PATENT DOCUMENTS 1,043,497 A * 11/1912 Abernethy ..... E01D 19/06 14/73.1
2,382,761 A * 8/1945 Wilks ..... E01D 19/125 52/506.09
3,066,771 A * 12/1962 Wolchuk ..... E01D 19/125 52/478
3,842,552 A * 10/1974 Hudson ..... E01D 2/00 52/174

(Continued)

OTHER PUBLICATIONS

Engineering drawing—American Douglas Metals, Inc. "Ridgemont Bridge Enlarged End View" dated Aug. 14, 2013.

*Primary Examiner* — William C Doerrler
(74) *Attorney, Agent, or Firm* — Woods Oviatt Gilman LLP; Katherine H. McGuire, Esq.

(57) ABSTRACT

A bridge assembly includes a plurality of platform members which may be secured to support beams via individual platform chassis which are configured to allow tool-less attachment bolt heads thereto. A plurality of specially configured clamps are attached to the free ends of the bolts and the clamps are used to secure the platform members to the platform chassis. The platform chassis are each secured to the outer support beams via L-brackets that are mounted between the chassis and support beams. The support beams include flanged channels wherein the heads of a plurality of bolts may be attached without the need for tools. The platform members may be laid in either a parallel or perpendicular orientation with respect to the outer support beams with two different clamp styles being used depending on the orientation selected.

12 Claims, 19 Drawing Sheets

(56) References Cited

U.S. PATENT DOCUMENTS 5,335,386 A * 8/1994 Newell ..... E01D 2/02 14/14
5,457,840 A * 10/1995 Derechin ..... E01D 19/125 14/6
5,483,716 A * 1/1996 Burnaman ..... E01D 19/125 14/73
5,617,599 A * 4/1997 Smith ..... E01D 19/125 14/73
6,023,806 A * 2/2000 Dumlao ..... B63B 5/00 14/73
6,345,403 B1 * 2/2002 Nagle ..... E01D 2/02 14/77.1
6,453,495 B1 * 9/2002 Meggers ..... E01D 19/125 14/73
6,857,456 B2 * 2/2005 Manning ..... B25H 1/10 144/286.5
7,795,329 B2 * 9/2010 Nosker ..... B29C 65/562 523/204
8,167,258 B1 * 5/2012 Wentworth ..... E04B 1/2403 248/214
2003/0046779 A1 * 3/2003 Dumlao ..... B63B 5/00 14/2.4
2006/0135005 A1 * 6/2006 Gelonek ..... E01D 15/133 439/894
2006/0272111 A1 * 12/2006 Kim ..... E01D 19/125 14/73
2008/0139367 A1 * 6/2008 Cooper ..... A63B 17/00 482/83
2010/0043153 A1 * 2/2010 Lerner ..... E01D 6/00 14/6
2011/0225746 A1 * 9/2011 Desrochers ..... E01D 19/086 14/73.1
2015/0053783 A1 * 2/2015 Austin ..... E01D 19/12 238/310
2016/0190974 A1 * 6/2016 Dickey ..... H02S 50/10 136/244
2016/0340918 A1 * 11/2016 Hollis ..... E04G 5/14

* cited by examiner

BRIDGE ASSEMBLY AND METHOD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

The present invention relates to bridge systems, and more particularly relates to a strong yet versatile bridge system especially adapted for vehicle and pedestrian use (e.g., cars, emergency vehicles, motorized golf carts, four wheelers, bicycles, foot traffic, etc.).

SUMMARY OF THE INVENTION

The present invention addresses the above need by providing a bridge assembly having components specifically designed to minimize both the complexity and time it takes to complete the installation at the job site—all while providing an extremely strong, durable and long-lasting bridge assembly requiring little to no maintenance.

In an embodiment of the invention, the bridge assembly includes a plurality of platform members which may be secured to the support beams via individual platform chassis which are configured to allow tool-less attachment bolt heads thereto. A plurality of specially configured clamps are attached to the free ends of the bolts and the clamps are used to secure the platform members to the platform chassis. The platform chassis are each secured to the outer support beams via L-brackets that are mounted between the chassis and support beams. The support beams include flanged channels wherein the heads of a plurality of bolts may be attached without the need for tools.

The platform members may be laid in either a parallel or perpendicular orientation with respect to the outer support beams with two different clamp styles being used depending on the orientation selected.

Curbs and optional railings are configured for easy installation to create a finished bridge assembly.

DESCRIPTION OF THE DRAWING FIGURES

The above-mentioned and other features and advantages of this invention, and the manner of attaining them, will become apparent and be better understood by reference to the following description of the invention in conjunction with the accompanying drawing, wherein:

FIGS. 1A and 1B are upper and lower perspective views of a bridge assembly in accordance with an embodiment of the invention, respectively;

FIGS. 2A-C are perspective assembled, perspective exploded, and end assembled views of a span of a bridge assembly in accordance with an embodiment of the invention, respectively;

Figure 8B:
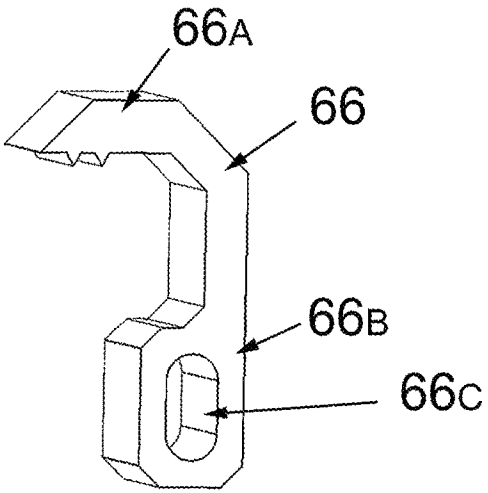
Figure 8C:
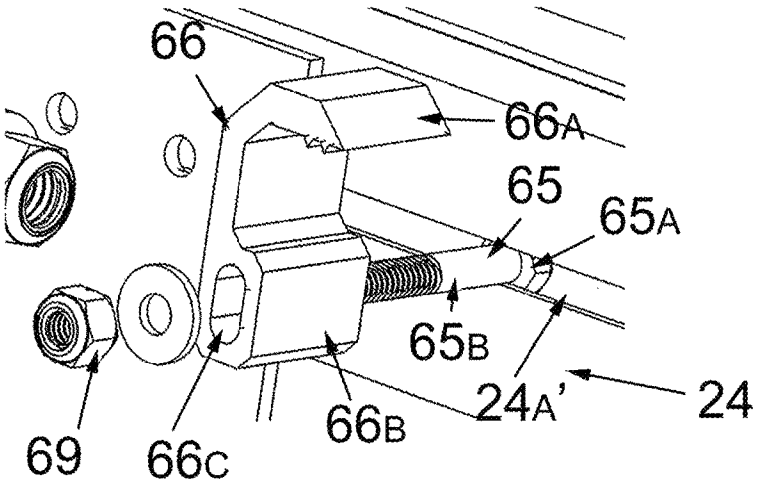
Figure 8A:
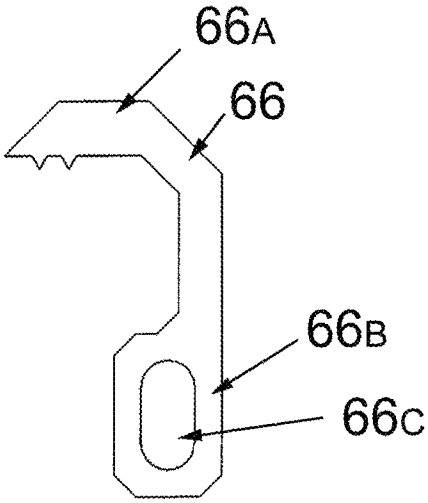
Figure 9A:
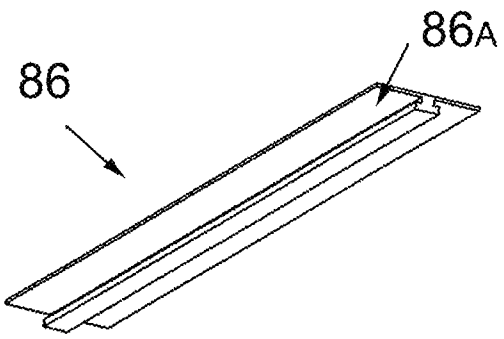
Figure 9B:
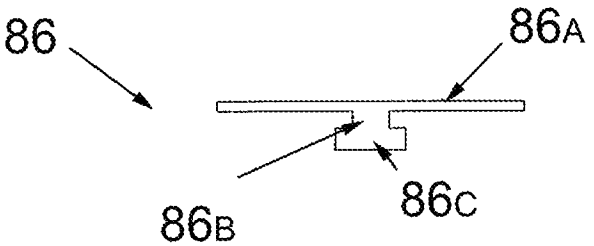
Figure 9C:
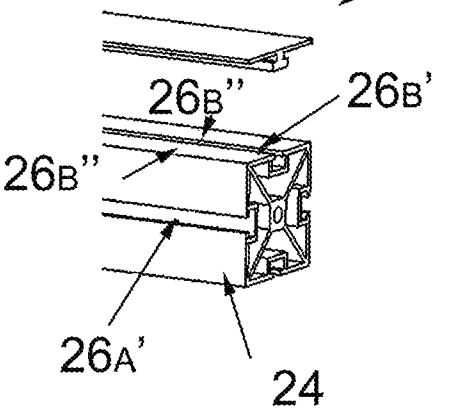
Figure 10A:
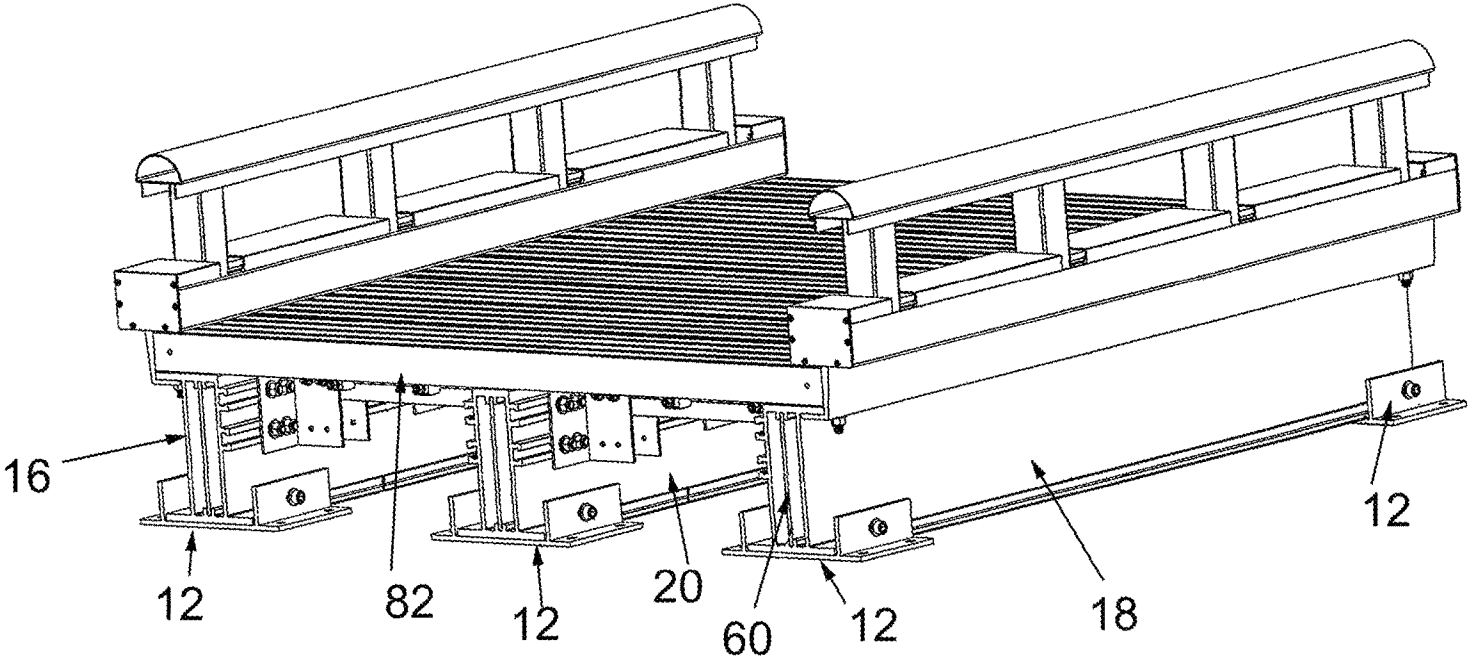
Figure 10B:
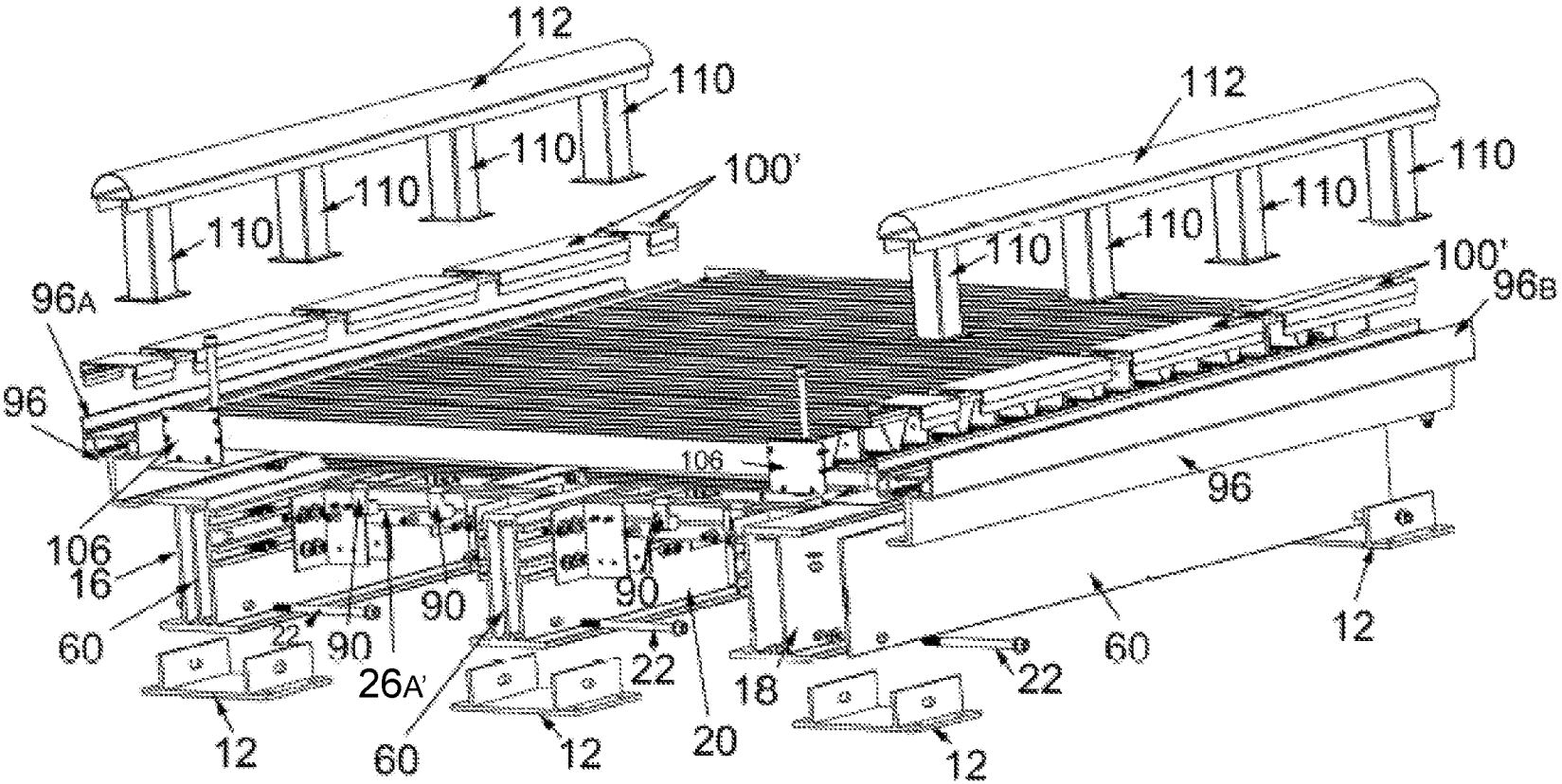
Figure 10C:
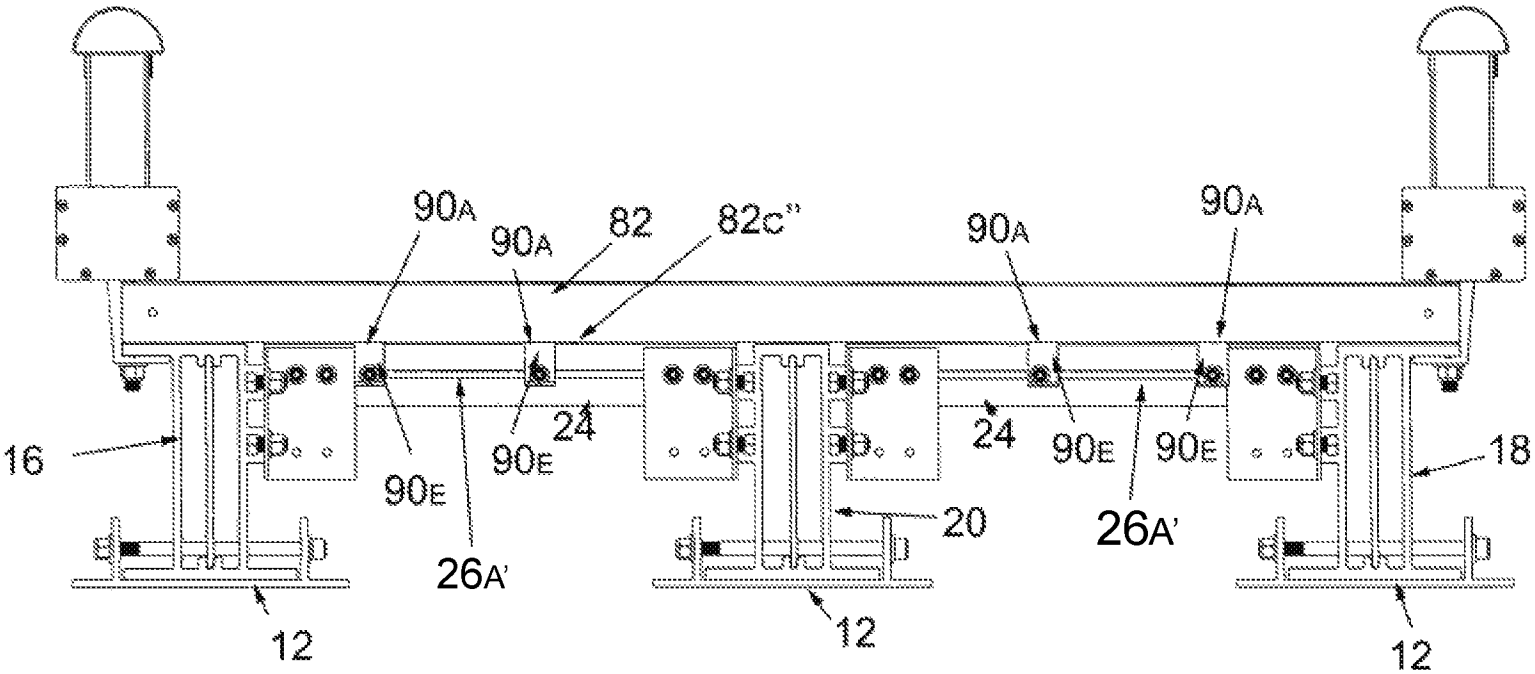
Figure 11B:
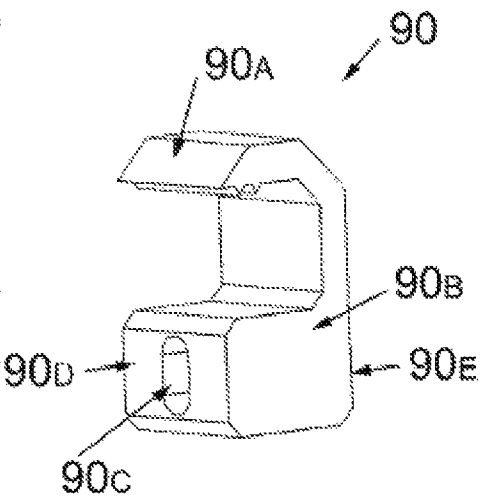
Figure 11A:
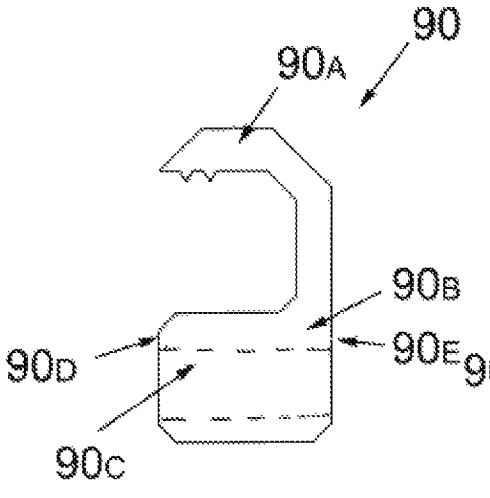
Figure 11C:
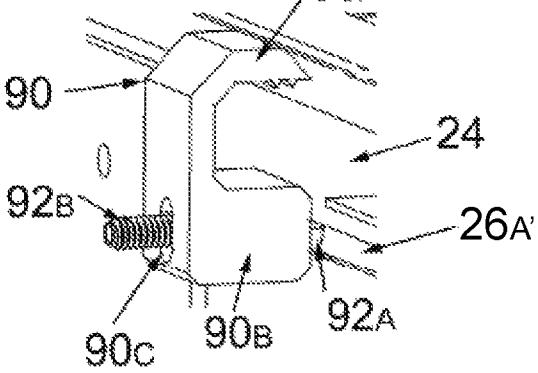
Figure 12:
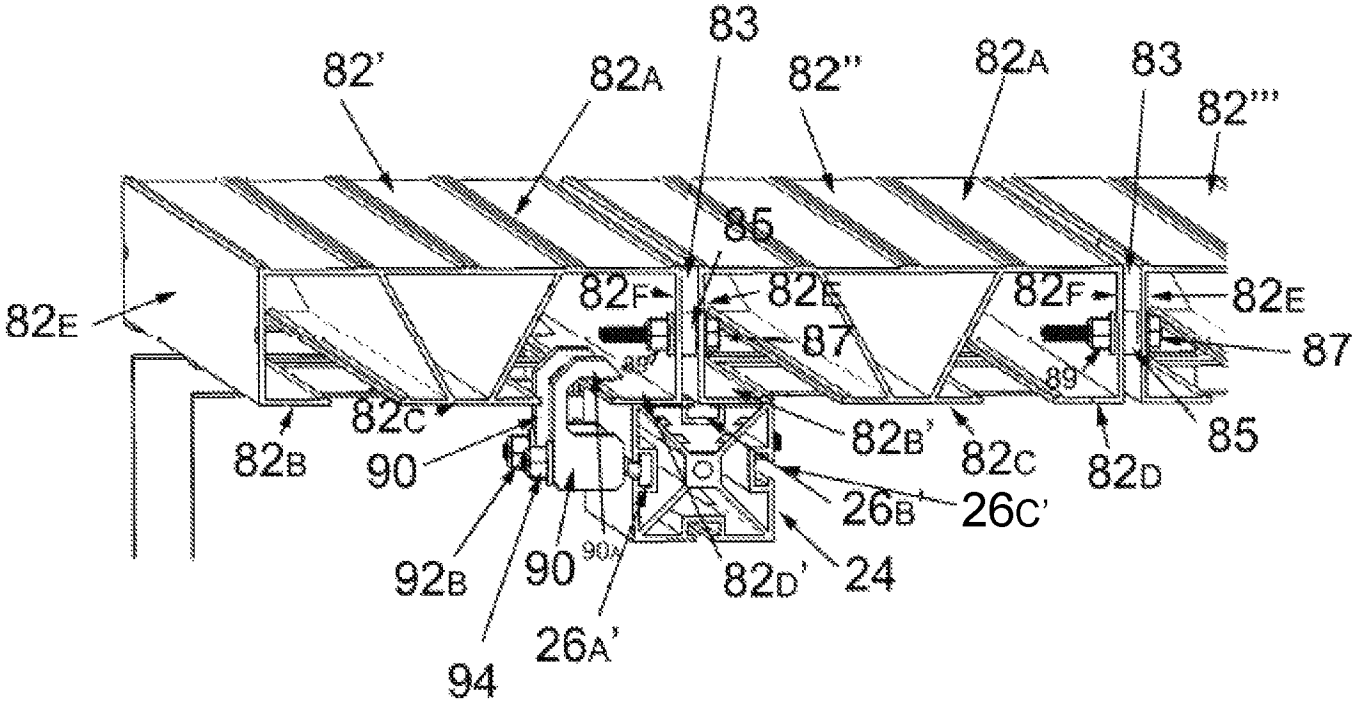
Figure 14:
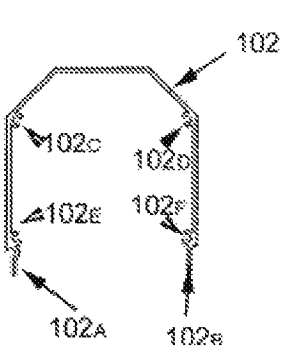
Figure 15:
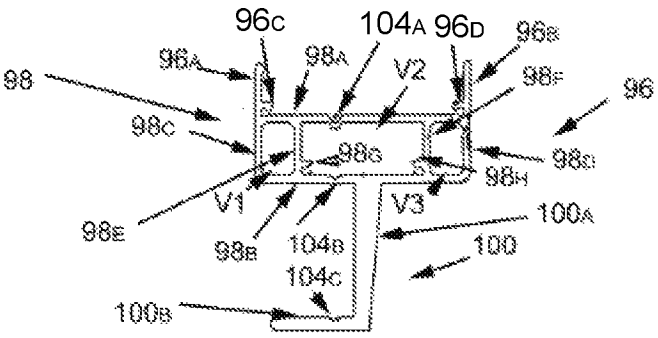
Figure 13:
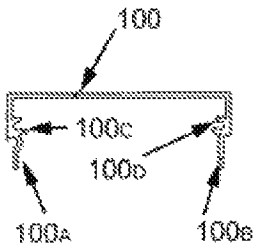
Figure 16:
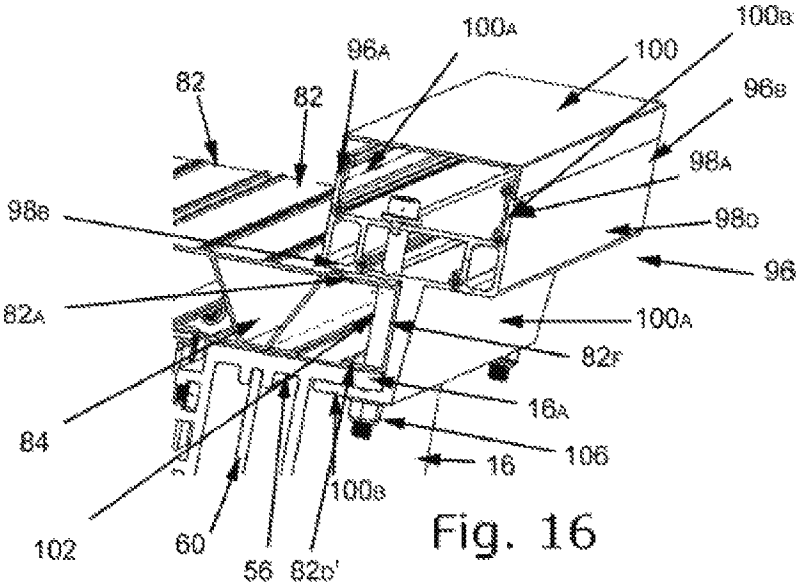
Figure 17:
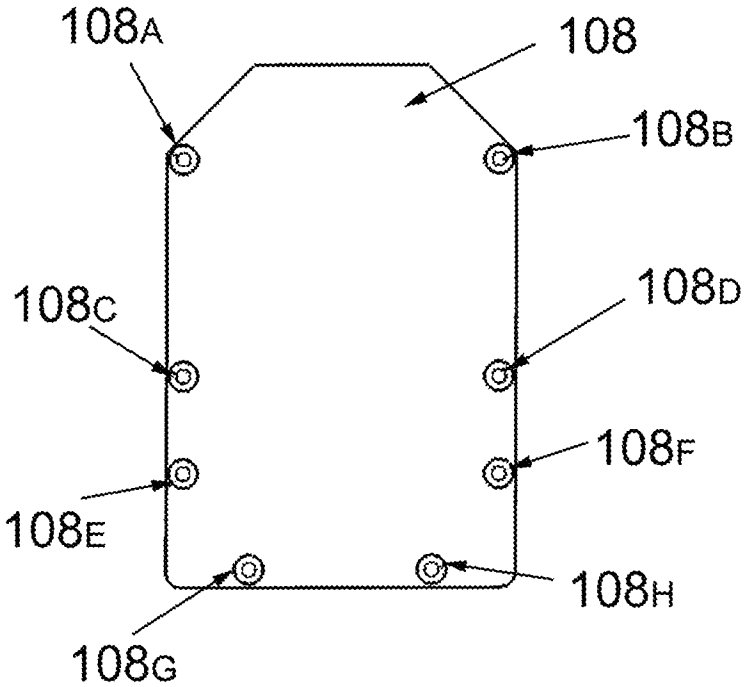

FIGS. 8A-C are side, perspective and fragmented perspective views of a clamp in accordance with an embodiment of the invention, respectively;

FIGS. 9A and 9B are perspective and end views of a gasket in accordance with an embodiment of the invention, respectively;

FIG. 9C is a fragmented perspective view of the gasket in spaced relation to the platform chassis;

FIGS. 10A-C are perspective assembled, perspective exploded, and end assembled views of a single span of a bridge assembly in accordance with another embodiment of the invention, respectively;

FIGS. 11A-C are side, perspective and fragmented perspective views of another embodiment of a clamp in accordance with an embodiment of the invention, respectively;

FIG. 12 is a fragmented perspective view showing the attachment of clamps between the platform members and chassis;

FIG. 13 is an end view of an embodiment of curb cover plate in accordance with an embodiment of the invention;

FIG. 14 is an end view of another embodiment of curb cover plate in accordance with an embodiment of the invention;

FIG. 15 is an end view of a curb beam in accordance with an embodiment of the invention;

FIG. 16 is a fragmented perspective view showing attachment of the curb beam to the outer support beam and curb cover plate; and FIG. 17 is an enlarged front elevational view of another embodiment of end plate in accordance with an embodiment of the invention.

Similar reference characters refer to similar parts throughout the several views of the drawings.

DETAILED DESCRIPTION

Figure 1A:
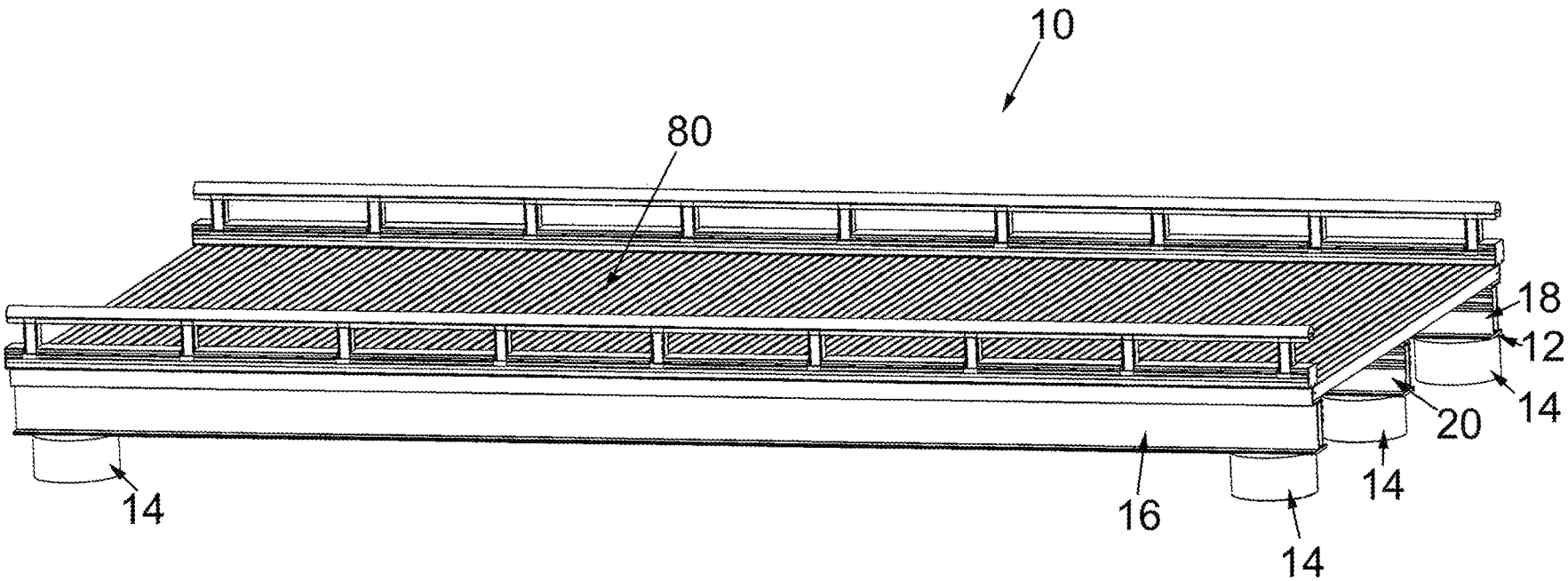
Figure 1B:
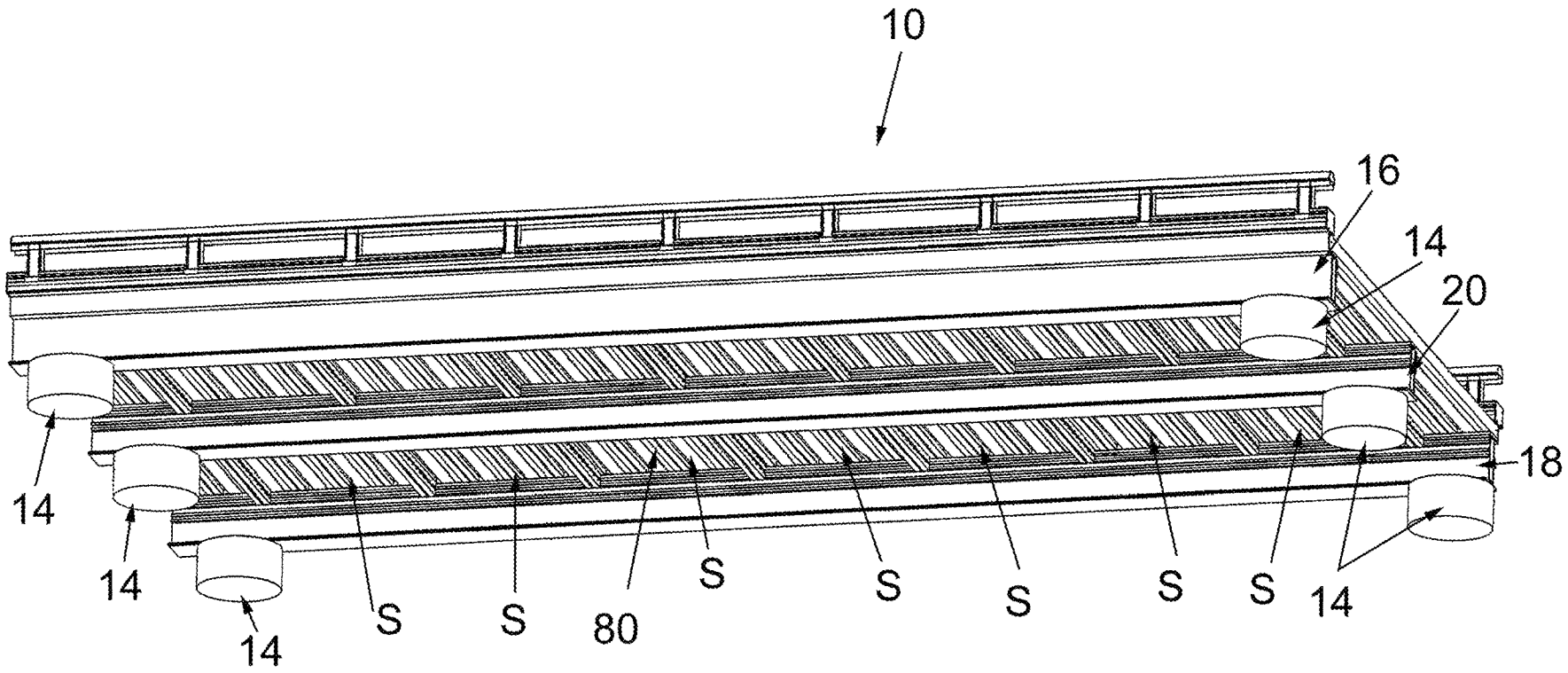

Referring now to the drawing, there is seen in FIGS. 1A and 1B an embodiment of the inventive bridge assembly designated generally by the reference numeral 10. In this embodiment, the platform members are placed in a perpendicular orientation as will be described below with reference to the embodiment of FIGS. 10A-C. The total length "L" of bridge assembly 10 may be varied according to the job site where bridge assembly 10 will be installed. For ease of illustration, FIGS. 2A-C and 10A-C each show a shorter bridge span "S" which is defined by the length between two consecutive platform chassis 24 used to support and connect the individual platform members to the support beams as described more fully below. A single bridge assembly 10 may consist of any number of spans "S" which may be installed in serial, longitudinally extending fashion to achieve the bridge length needed to fully cross the land feature over which the bridge assembly 10 is to be installed. The exact number of spans "S" to be used in a given application will be decided by the people assigned to the job (e.g., the bridge company sales associate and/or site engineer, for example). It is also understood that while the support beams 16, 18 and 20 are shown in FIGS. 2A-C and 10A-C as length of the span, the support beams in actuality may extend the full length of the bridge assembly 10.

One of the first steps in the bridge installation process requires mounting of each bearing plate 12 onto a respective support structure such as a pier 14 which are installed at the job site (not shown), for example. The pilings or piers 14 extend into the earth to a suitable depth in a known manner (e.g., using sono tubes, not shown) to provide the necessary structural support for bridge assembly 10.

The assembly of a single bridge span "S" will now be described. The opposite longitudinal sides of the bridge assembly span are formed with first and second outer support beams 16 and 18, respectively. A center support beam 20 is placed parallel to and midway between the first and second outer support beams 16, 18. It is noted that for a very narrow bridge (e.g., for bicycle and/or foot traffic only), a center support beam 20 might not be necessary. Conversely, for very wide bridge requirements, more than one center support beam 20 may be employed as needed.

Bolts 22 extend through aligned holes "h" formed in the bearing plates and support beams to securely connect the bearing plates to the support beams. Bearing plates 12 (and their respective earth supports) are located at each end of all the support beams and may optionally be placed in other locations along the support beams as necessary or desired.

Figure 3A:
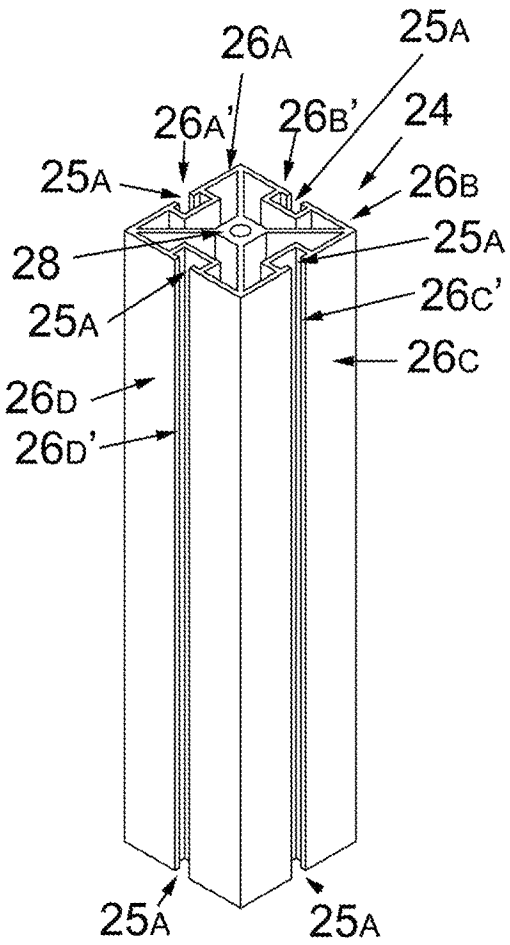
FIG. 3A is a perspective view of a platform chassis in accordance with an embodiment of the invention.
Figure 3B:
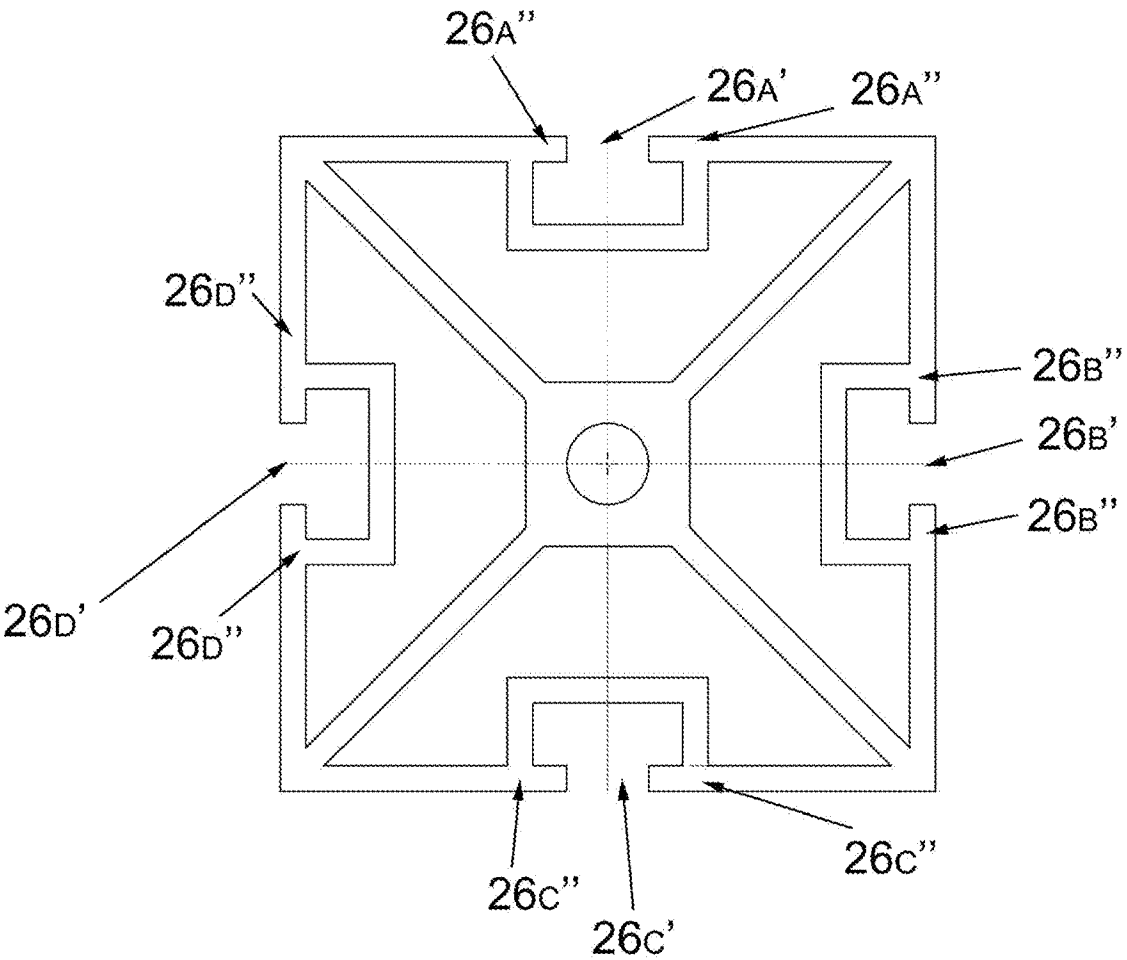
FIG. 3B is an enlarged end view of the platform chassis of FIG. 3A
Figure 4A:
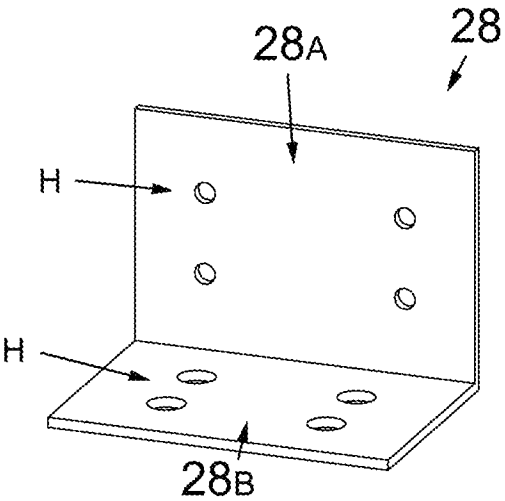
FIGS. 4A and 4B are perspective and end views of a bracket in accordance with an embodiment of the invention, respectively.
Figure 4B:
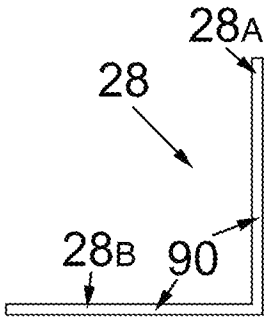

Each bridge span "S" further includes one or more platform chassis 24 which are secured to and extend perpendicularly between the support beams. As seen best in FIGS. 3A and 3B, platform chassis 24 may be formed substantially rectangular in cross section with four sides 26A-D. Each side 26A-D may further include a longitudinally extending channel 26A'-D' which may also be rectangular in cross section. Each channel may further include a pair of flanges 26A"-D" at their channel opening which form an anchor point for attaching other components to the platform chassis 24.

Referring again to FIGS. 2A-C, each platform chassis 24 is secured between the outer and center support beams via L-brackets 28 each having first and second walls 28A, 28B extending at a substantially 90° angle to each other as seen best in FIGS. 4A-D via bolts 30 and respective nuts 32. In this regard, it is seen that the support beams include flanged channels 34 and 34' which may extend the full longitudinal lengths of the support beam. The heads of bolts 30 may be inserted into the channels 34, 34' at the end of the support beam thereby capturing the bolt within the channels. The bolt is slidable within the channel such that it may be positioned at any position therealong as needed to properly align the bolt 30 with the location of a respective bracket 28. The shaft of the bolt extends outwardly of the channel and may be passed through a hole "h" of the L-bracket wall 28B whereby a nut 32 may be threaded to the free end of the bolt to secure the L-bracket 28 to the support beam. The heads of the bolts are captured within the flanged channel 24a' of the chassis by passing the bolt head into a channel opening 25a at either end of the chassis (see FIG. 3a) with the bolt shank extending exteriorly of the flanged channel. The chassis 24 and L-bracket are secured together by passing the bolt 40 through a respective hole in L-bracket wall 28A and securing a nut 41 to the free end of the bolt 40. This manner of bolt attachment to the chassis is also used for securing the deck clamps as seen in the enlarged views of FIGS. 8A and 9C which are described in more detail below.

Figure 5:
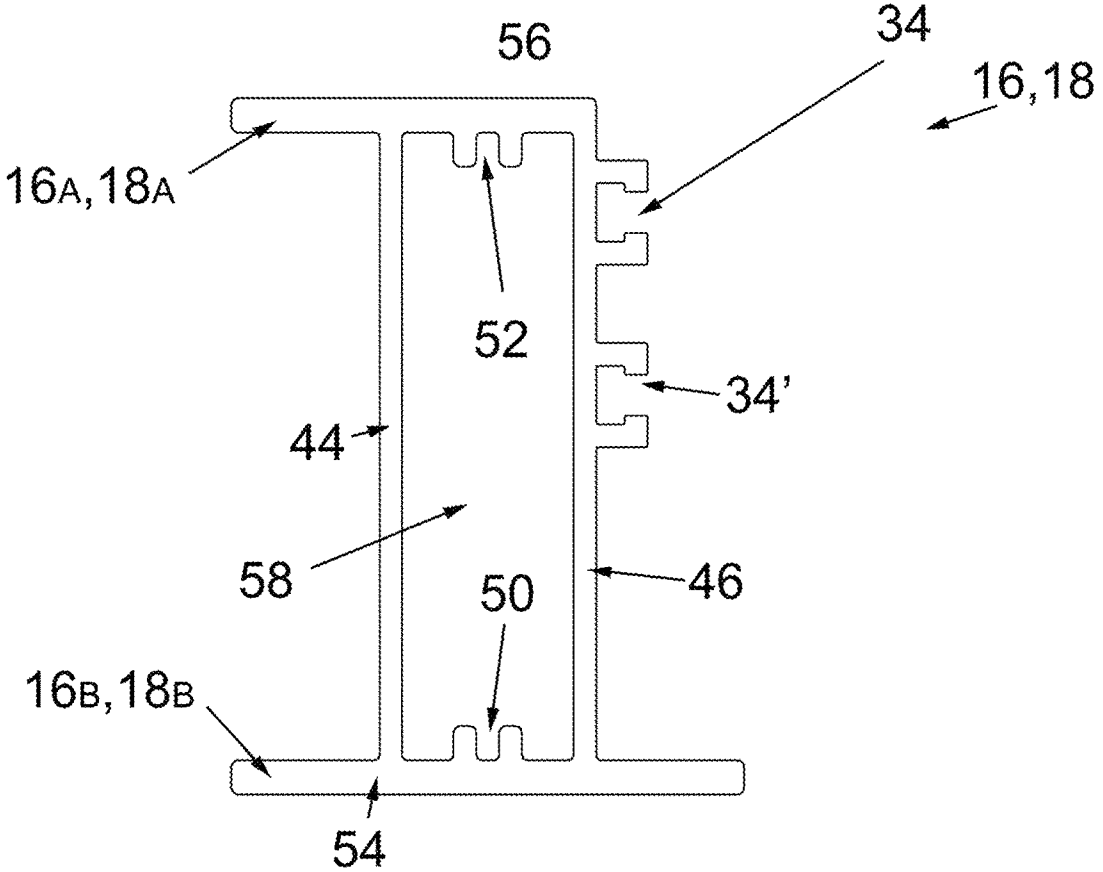
FIG. 5 is an end view of an outer support beam in accordance with an embodiment of the invention.

The first and second outer support beams 16, 18 are preferably identical in construction and include spaced parallel walls 44, 46 as seen best in FIG. 5. As discussed above, flanged channels 34 and 34' are formed along beam wall 46 and are configured with inwardly directed flanges to allow the passage of a bolt head at a desired location along the channels 34, 34'.

Each support beam 16, 18 may be even further strengthened via the use of an optional reinforcement plate 60. Plate 60 may be removably mounted to a respective support beam by inserting and sliding the opposite plate edges 60a and 60b into channels 50 and 52 formed on the inwardly facing surfaces of the beam end plates 54 and 56 within beam center space 58, respectively. Likewise, a reinforcement plate 60 may also be positioned in center support beam 20 by inserting and sliding the opposite plate edges 60A and 60B into channels 62 and 64 formed on the inwardly facing surfaces of the beam end plates 76 and 78 within beam center space 70, respectively.

Figure 6:
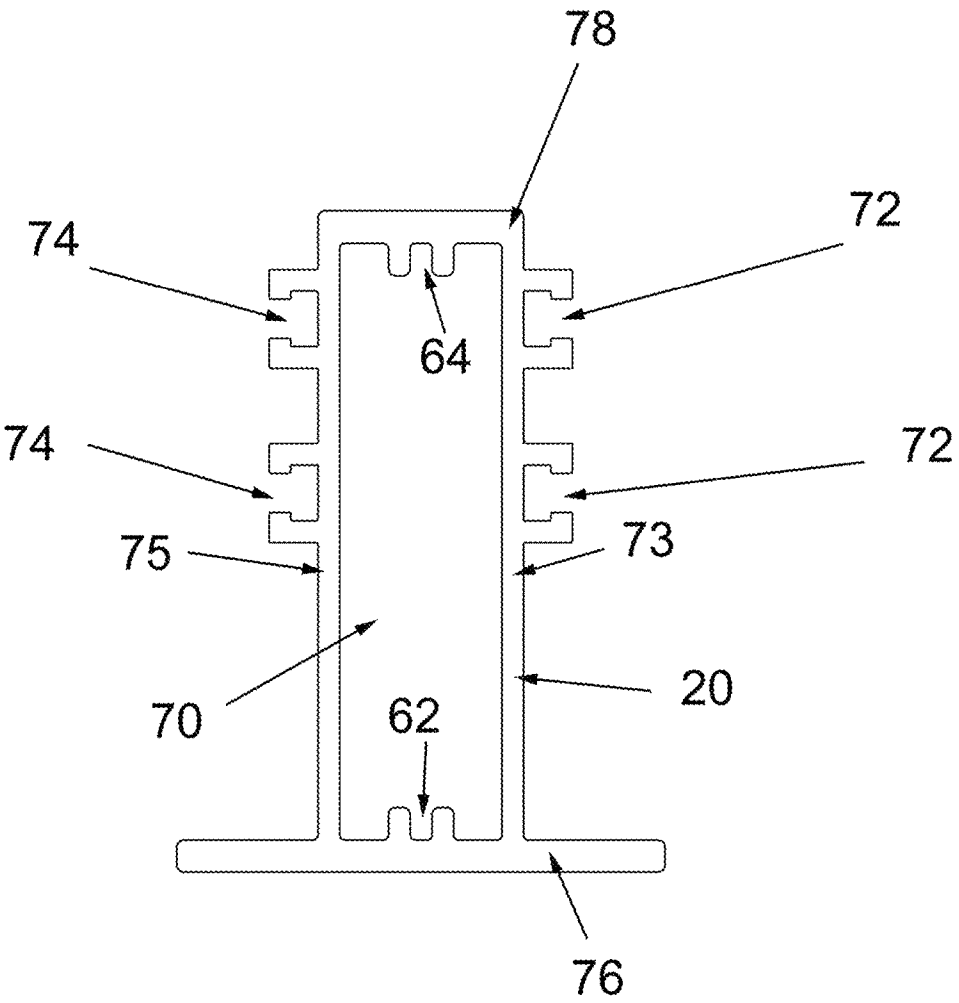
FIG. 6 is an end view of a center support beam in accordance with an embodiment of the invention.

As seen best in FIGS. 5 and 6, while the outer support beams 16, 18 only have flanged channels on one side thereof, center support beam 20 includes flanged channels 72, 74 on each of the opposite side walls 73 and 75 thereof, respectively. As such, first and second platform chassis 24 may interconnect the first and second outer support beams 16, 18 with the center support beam 20, respectively. Once the support beams 16, 18, 20 and the first and second platform chassis 24 are interconnected, the decking platform 80 is installed thereon as described below.

Figure 7B:
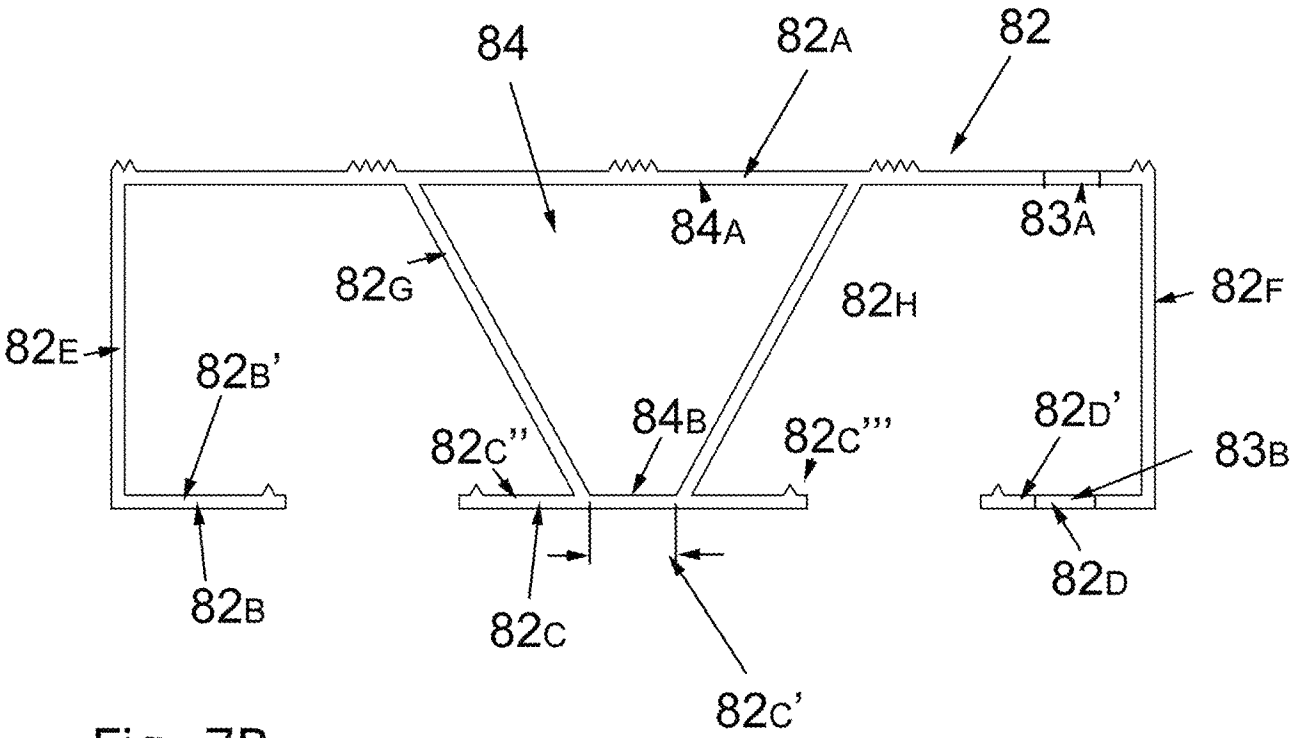
FIG. 7B is a reduced perspective view of the platform member of FIG. 7A.
Figure 7A:
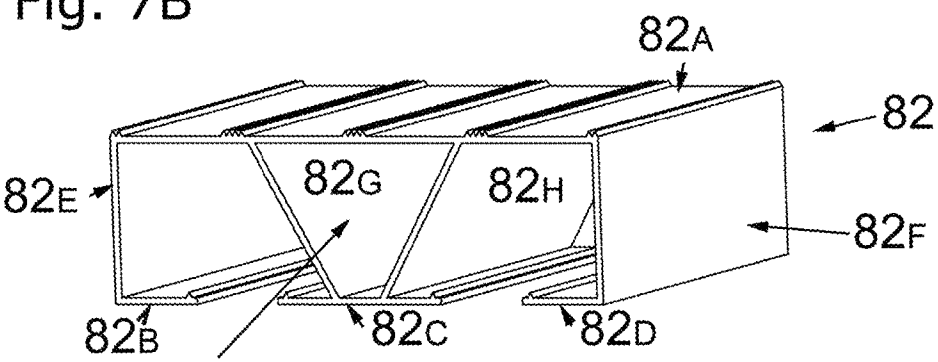
FIG. 7A is an end view of a platform member in accordance with an embodiment of the invention.

The decking platform 80 comprises a plurality of individual platform members 82 arranged in parallel fashion and which are each uniquely configured for high strength and durability. Each platform member 82 is preferably constructed as a single extruded aluminum part with no welds. As seen best in FIGS. 7A and 7B, each platform member 82 includes a single upper wall 82A and first, second and third spaced lower walls 82B, 82C and 82D, respectively, all of which lie in a common plane which extends in spaced, parallel relationship to the plane of upper wall 82A. Interconnecting upper and lower walls 82A, 82B are first and second outer walls 82E, 82F, respectively, which extend substantially parallel to each other and perpendicular to the upper and lower walls. A pair of first and second walls 82G and 82H extend at an angle between upper wall 82A and center lower wall 82C to form a truncated triangular center opening 84 therebetween which extends the full length of platform member 82. In the preferred embodiment, the base 84A of the truncated triangular center opening is defined by upper wall 82A with the smallest side 84B defined by a center section of middle lower wall 82C. The truncated triangular opening provides additional strength and durability to the platform member. Although a truncated triangular opening is shown, other shapes are possible.

The first and third lower walls 82B and 82D include inwardly facing surfaces 82B' and 82D' which provide a ledge upon which a securing clamp 66 may engage to interconnect each platform member 82 to the platform chassis 24. As seen best in FIGS. 8A-C, clamp 66 includes a finger portion 66A extending from a main portion 66B with main body portion 66B having a hole 66C. Clamp 66 is attached to a platform chassis 24 by inserting the head portion 65A of a bolt 65 within channel 65A at the chassis end wherethrough the shaft 65B of bolt 65 may pass (see FIG. 8C). A nut 69 is then threaded to the exposed end of the bolt thereby securing the clamp to the chassis. Since the bolt may be slid along the channel to any desired location as explained above, it is a simple manner to align the bolt and then the clamp to a position where the finger portion engages the platform member lower plate.

Referring to FIGS. 9A-C, an elongated gasket 86 is provided which is preferably formed of a resilient material such as rubber which may be molded or extruded as a single piece. The cross section is configured in a geometry that allows the gasket to be removably slid into chassis channel 26B' which is the channel facing the decking platform 80. In the preferred embodiment shown, the gasket is configured with a base portion 86A extending into a narrowed neck area 86B which extends into a head portion 86C. The gasket 86 is directed into the channel 26B' with the head portion 86C becoming located within channel 26B' and the narrowed neck area 86B located between channel flanges 26B". The installed gasket 68 provides a cushion and sound dampening effect between the platform chassis 24 and platform members 82 for a more quiet and smooth ride over the bridge.

Figure 2A:
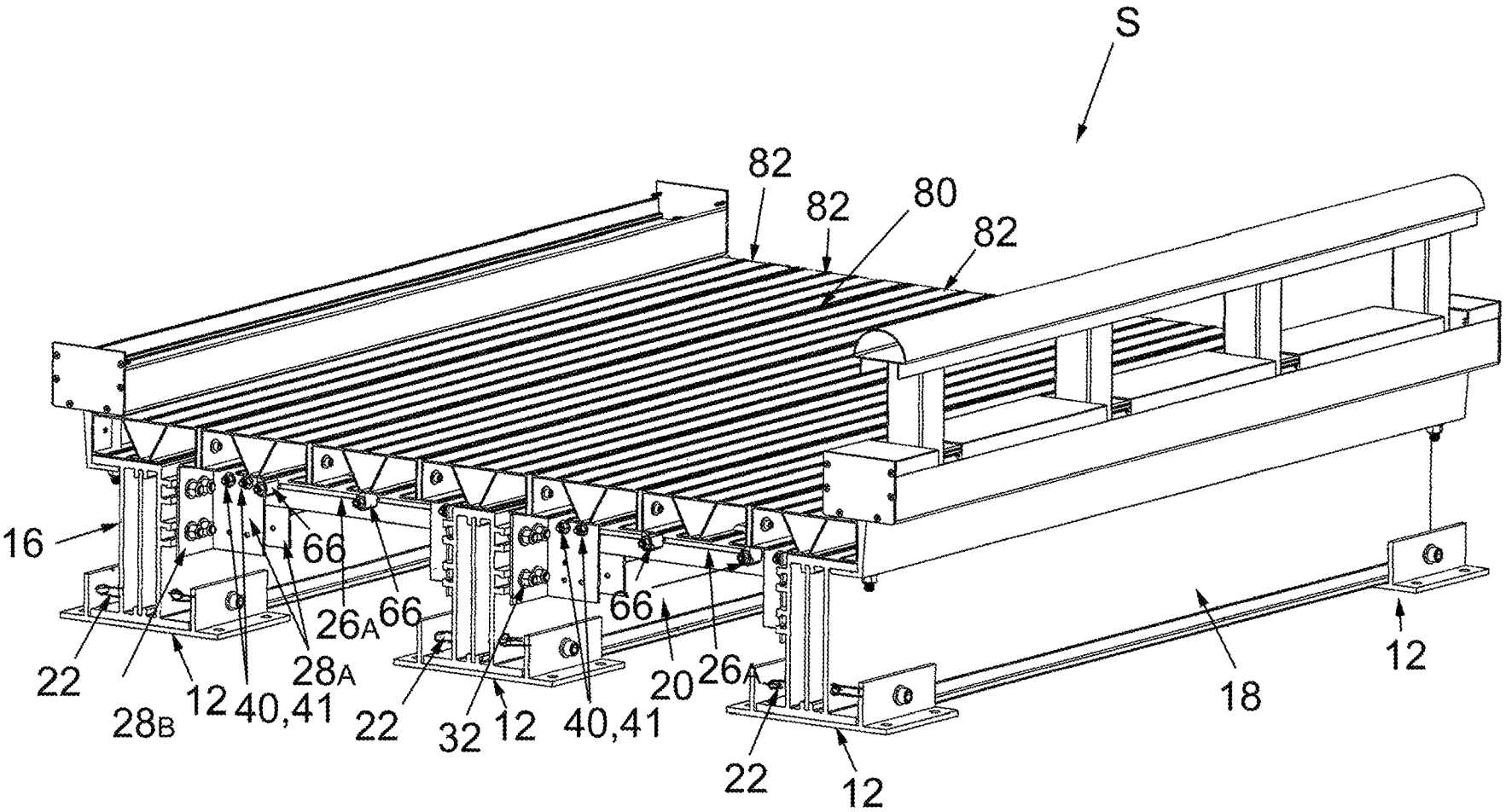
Figure 2B:
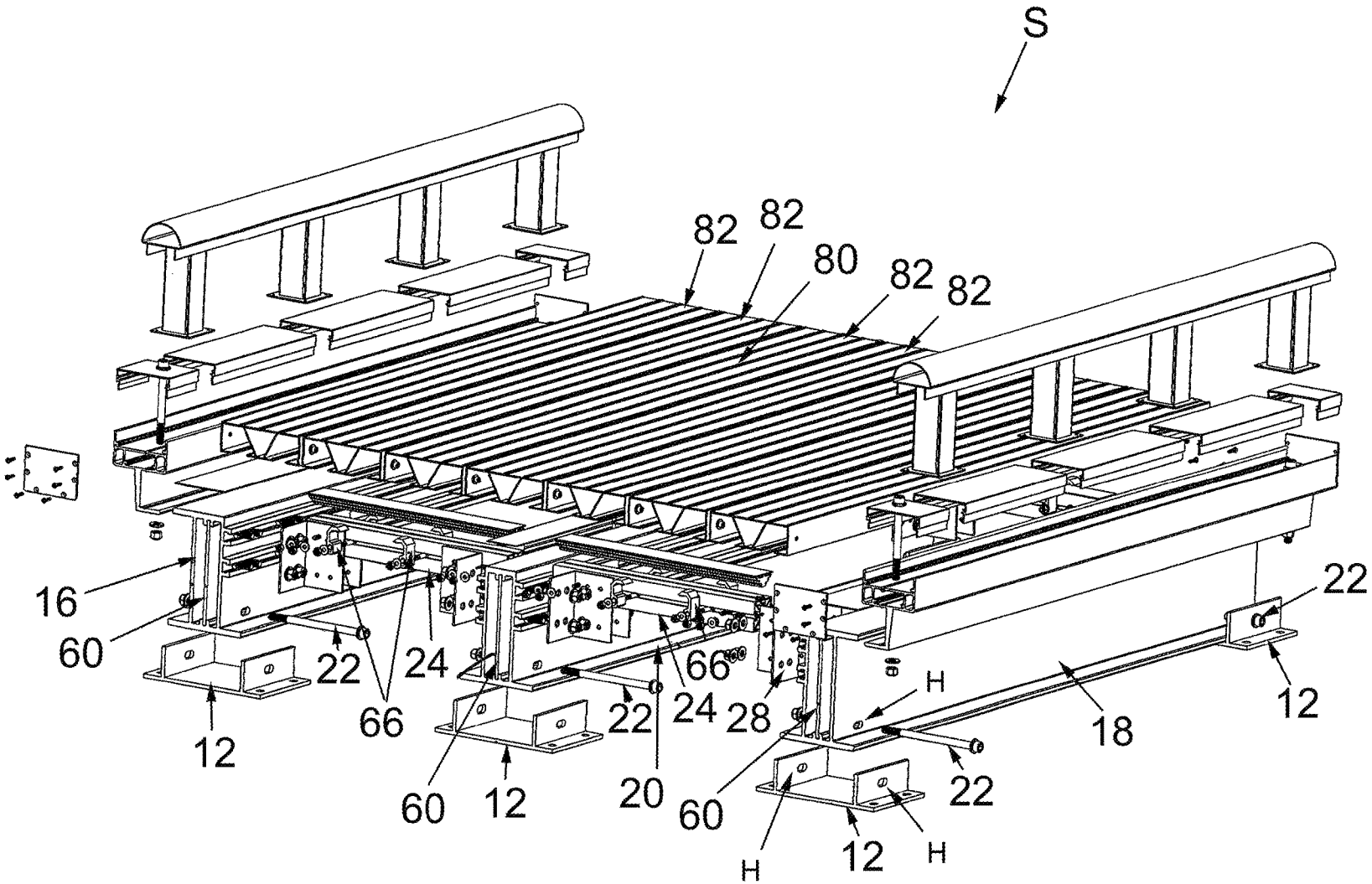
Figure 2C:
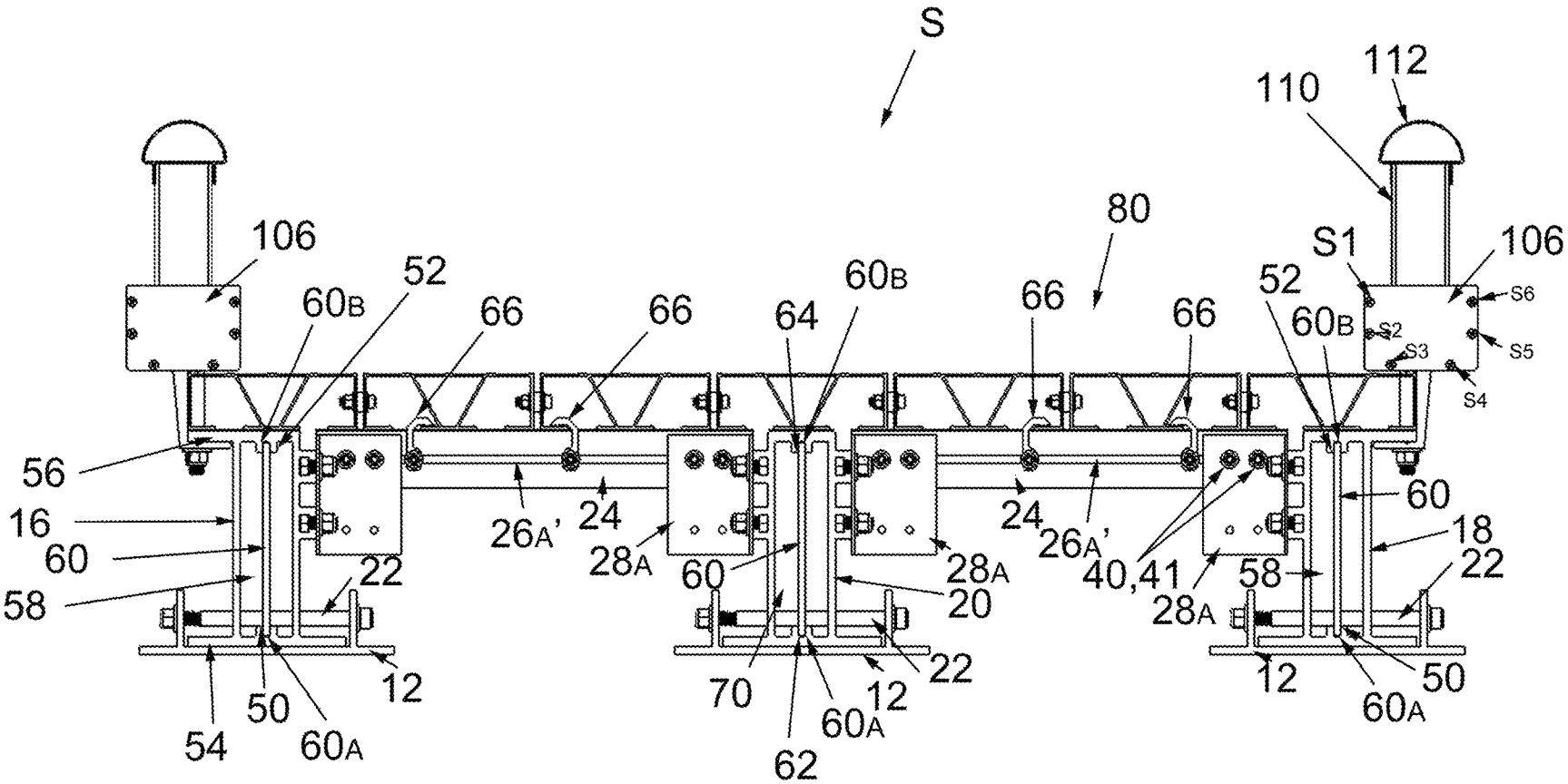

The platform members 82 may be laid in a direction either parallel to the support beams as shown in FIGS. 2A-C, or in a direction perpendicular thereto as shown in FIGS. 10A-C. When laid in the perpendicular orientation, a different style of clamp 90 is used as seen best in FIGS. 11A-C. Clamp 90 is seen to include a hooked finger portion 90A extending from a main body portion 90B. A hole 90C extends through main body portion 90B from the clamp back wall 90D to the clamp front wall 90E. Bolt head 92A is located in channel 26A' with bolt shaft 92B extending outwardly therefrom. As explained above, the bolts are connected to the chassis by passing the bolt head 92A into the channel at either end of the chassis with the bolt shaft 92B extending exteriorly of the channel. The bolt is then slidable to any desired location with the respective channel.

Clamps 90 are mounted to a respective platform chassis by extending the bolt shaft 92B through clamp hole 90C as shown in FIG. 11C. A washer and nut 94 are then threaded to the bolt shaft 92B as seen in FIG. 12. The clamp finger portion 90A is engaged with the inwardly facing surface 82D' of the platform member 82 and the nut 94 is tightened thereby firmly clamping platform member 82 to chassis 24.

As seen best in FIG. 12, first and second platform members 82' and 82" are positioned in a coplanar manner with the third lower wall 82D of the first member 82' located adjacent the first lower wall 82B of the second platform member 82". It is preferred to create a space 83 between the adjacent side walls 82F and 82E of the adjacent platform members to allow water to drain from the platform 80. A spacer 85 may be positioned between the adjacent side walls 82F and 82E and a bolt 87 is passed through aligned holes formed in the side walls 82F and 82E and spacer 85 and secured with a washer and nut 89. Although not shown in FIG. 12, another spacer and bolt/nut are also attached in the same manner at the ends of the adjacent platform members 82', 82" located opposite to the ends seen in FIG. 12.

The adjacent platform member lower walls 82D and 82B are laid upon chassis 24 with the space 83 therebetween extending in colinear alignment with chassis channel 26B'. Although not shown in FIG. 12, it is understood that additional clamps 90 are to be positioned on the opposite side of chassis 24 between channel 26C' and wall surface 82B' of second platform member 82". As many clamps 90 as desired are mounted to chassis 24 to ensure a secure attachment of each platform member 82 to each platform chassis 24.

Curbs and optional railings are mounted to the outer support beams 16 and 18. As seen best in FIGS. 15 and 16, a curb beam 96 is provided for mounting to a respective outer support beam 16, 18. Curb beam 96 is configured as a unitary piece having a hollow main body portion 98 with top, bottom and opposite side walls 98A-D, respectively and internal spaced, parallel walls 98E and 98F defining first, second and third parallel voids $V_1$-$V_3$ which extend the full length of curb beam 96. Curb beam 96 further includes a wall segment 100A extending from the center of main body portion bottom wall 98B. Another wall segment 100B extends at a right angle to wall segment 100A which together form an L-shaped extension 100.

To mount curb beam 96 to outer support beam 16, the curb beam 96 is fit to the support beam 16 with wall segment 100A abutting platform member side wall 82F, wall segment 100B extending under and abutting support beam flange 16A and main body portion bottom wall 98B lying on top of platform segment upper wall 82A. Although only support beam 16 is shown in FIG. 16 for purposes of description, it is understood the same process is followed on support beam 18. The curb beam is then secured to the support beam with a bolt 102 which is passed through aligned holes 104A-C in curb beam 96, holes 83A,B in platform member 82 (see FIG. 7B), and hole in support beam flange 16A. A washer and nut 106 are secured to the bolt end beneath wall segment 100B (FIG. 16).

If no railings are to be installed, the curbs are finished with elongated cover plates which may be of any desired ornamental shape and size such as the short rectangular and tall truncated gable versions 100 and 102 shown in FIGS. 13 and 14, respectively. The cover plates 100 and 102 include respective opposite side walls 100A, 100B and 102A, 102B which may be inserted and fit between opposite side walls 96A and 96B which extend upwardly from main body portion 98. Screw anchor points 100C-D are provided on cover plate 100 and screw anchor points 96C,D are provided on side walls 96A, 96B, respectively. An end plate 106 (FIG. 2C) is provided and includes holes which align with the screw anchor points 100C and 100D wherethrough screws S1 and S6 may be passed to secure the cover plate to the end plate. The end plate further includes holes which align with the screw anchor points 96C and 96D on curb beam 96 and wherethrough screws S2 and S5 may be passed to secure the end plate 106 to the curb beam 96. Lastly, curb beam 16 is seen to include screw anchor points 98G and 98H which align with holes on end plate 106 and wherethrough screws S3 and S4 may be passed to further secure end plate 106 to curb beam 96. When using taller curb cover plate 102, there are four screw anchor points 102C-F on cover plate 102 which align with four holes 108A-D on end plate 108 (FIG. 17) and wherethrough screws may be passed to anchor cover plate 102 to end plate 108. The remaining four holes 108E-H on end plate 108 align with the screw anchor points 96C, D and 98G,H on curb beam 96, respectively, and wherethrough screws may be passed to anchor end plate 108 to curb beam 96.

When railings 110 are to be installed, the curb cover plates 100, 102 are not used and the railings are bolted to the curb beam 96. Cover plates, which may be segments of cover plates 100, 102, are secured between the railings and a top hand rail 112 may be secured to the railings to create a finished look.

Most parts described herein are preferably made of extruded aluminum although other materials and manufacturing processes therefor may be utilized as desired.

While this bridge assembly and method have been shown and described with reference to certain preferred embodiments thereof, it will be understood by those skilled in the art that various changes in form and details may be made therein without departing from the spirit and scope of the invention as described.

What is claimed is:

1. A bridge assembly comprising:

a) first and second outer support beams configured to be installed over a land feature in spaced, parallel relation to each other and each having at least one flanged channel configured to receive the head of a bolt within the channel with the bolt shaft extending outwardly of the channel;

b) a plurality of platform chassis configured to attach to and extend perpendicularly between said first and second outer support beams, said plurality of platform chassis each further including at least one longitudinally extending channel;

c) a plurality of platform members configured to attach to said plurality of platform chassis;

d) a plurality of clamps configured to attach to said plurality of platform chassis and secure said plurality of platform members to said plurality of platform chassis, said plurality of clamps each having a main body portion and a finger portion with said main body portion attached to said platform chassis at the location of said at least one longitudinal channel and said finger portion attached to said platform member;

e) a center support beam configured to be installed between and parallel to said first and second outer support beams, said plurality of platform chassis being attached to and extending perpendicularly between said center support beam and said first and second outer support beams; and f) a plurality of L-shaped brackets attached to and interconnecting said plurality of platform chassis to said center support beam and said first and second outer support beams.

2. The bridge assembly of claim 1 wherein said center support beam includes at least one flanged channel configured to receive the head of a bolt within the channel with the bolt shaft extending exteriorly of the channel, and wherein each of said L-shaped brackets is mounted to a respective said bolt shaft extending from said center support beam and wherein each of said platform chassis include at least one longitudinally extending channel wherein the head of a bolt may be removably and slidingly positioned with the shaft of the bolt extending exteriorly of the platform chassis channel, and wherein said L-shaped bracket is mounted to said bolt shaft extending from a respective platform chassis and thereby attaching the said respective platform chassis to said center support beam.

3. The bridge assembly of claim 1 wherein said first and second outer support beams each include at least one flanged channel configured to receive the head of a bolt within said flanged channel with the bolt shaft extending outwardly of the channel, and wherein each of said platform chassis include at least one longitudinally extending channel wherein the head of a bolt may be removably and slidingly positioned with the shaft of the bolt extending exteriorly of the platform chassis channel.

4. The bridge assembly of claim 3 wherein a respective said L-shaped bracket is mounted to a respective said bolt shaft extending from a respective said first and second outer support beam and also to said bolt shaft extending from a respective platform chassis, each said L-shaped bracket thereby attaching and interconnecting said respective platform chassis to said first outer support beam and another platform chassis to said second outer support beam, respectively.

5. The bridge assembly of claim 4 wherein said first and second outer support beams each include a beam center space defined between first and second beam end plates, said first and second beam end plates each including a channel, and further comprising a reinforcement plate having opposite plate edges configured for removable mounting to a respective support beam by inserting and sliding said opposite plate edges into said channels on said first and second beam end plates, respectively.

6. The bridge assembly of claim 1 wherein said platform members each include a truncated triangular center opening extending the full length of said platform member.

7. A method of bridge assembly, said method comprising the steps of:

a) providing and installing first and second outer support beams over a land feature in spaced, parallel relation to each other and each having at least one flanged channel configured to receive the head of a bolt within the channel with the bolt shaft extending outwardly of the channel;

b) providing and attaching a plurality of platform chassis perpendicularly between said first and second outer support beams, said plurality of platform chassis each further including at least one longitudinally extending channel;

c) providing and attaching a plurality of platform members to said plurality of platform chassis;

d) providing and attaching a plurality of clamps to said plurality of platform chassis and securing said plurality of platform members to said plurality of platform chassis with said clamps, said plurality of clamps each having a main body portion and a finger portion with said main body portion attached to said platform chassis at the location of said at least one longitudinal channel and said finger portion attached to said platform member;

e) providing a center support beam between and parallel to said first and second outer support beams and perpendicularly extending and attaching said plurality of platform chassis to said center support beam and said first and second outer support beams; and f) providing and attaching a plurality of L-shaped brackets wherein the plurality of L-shaped brackets are attached to and interconnecting said plurality of platform chassis to said center support beam and said first and second outer support beams.

*8. A bridge assembly comprising:*

*a) first and second outer support beams configured to be installed over a land feature in spaced, parallel relation to each other and each having at least one flanged channel configured to receive the head of a bolt within the channel with the bolt shaft extending outwardly of the channel;*

*b) a plurality of platform chassis configured to attach to and extend perpendicularly between said first and second outer support beams, said plurality of platform chassis each further including at least one longitudinally extending channel;*

*c) a plurality of platform members configured to attach to said plurality of platform chassis, each said platform members including first and second outer walls each connected to a respective lower wall having an inwardly facing surface;*

*d) a plurality of clamps configured to attach to said plurality of platform chassis and secure said plurality of platform members to said plurality of platform chassis, said plurality of clamps each having a main body portion and a finger portion with said main body portion attached to said platform chassis at the loca-*

*tion of said at least one longitudinal channel and said finger portion attached to said inwardly facing surface of each said lower wall of a respective said platform member;*

*wherein said plurality of platform members extend parallel to said first and second outer support beams with said clamp finger portion extending in a direction parallel to a respective said platform chassis.*

*9. The bridge assembly of claim 8 wherein said main body portion of each of said clamps includes a hole and further including a bolt have a head portion positioned with said longitudinal channel of a respective said platform member, said bolt having a shaft extending from a respective said head which extends through said hole in said main body portion of a respective said clamp thereby securing said clamp to a respective said platform chassis.*

*10. A bridge assembly comprising:*

*a) first and second outer support beams configured to be installed over a land feature in spaced, parallel relation to each other and each having at least one flanged channel configured to receive the head of a bolt within the channel with the bolt shaft extending outwardly of the channel;*

*b) a plurality of platform chassis configured to attach to and extend perpendicularly between said first and second outer support beams, said plurality of platform chassis each further including at least one longitudinally extending channel;*

*c) a plurality of platform members configured to attach to said plurality of platform chassis, each said platform members including first and second outer walls each connected to a respective lower wall having an inwardly facing surface;*

*d) a plurality of clamps configured to attach to said plurality of platform chassis and secure said plurality of platform members to said plurality of platform chassis, said plurality of clamps each having a main body portion and a finger portion with said main body portion attached to said platform chassis at the location of said at least one longitudinal channel and said finger portion attached to said inwardly facing surface of each said lower wall of a respective said platform member;*

*wherein said plurality of platform members extend perpendicular to said first and second outer support beams with said clamp finger portion extending in a direction perpendicular to a respective said platform chassis.*

*11. The bridge assembly of claim 10 wherein said main body portion of each of said clamps includes a hole and further including a bolt have a head portion positioned with said longitudinal channel of a respective said platform member, said bolt having a shaft extending from a respective said head which extends through said hole in said main body portion of a respective said clamp thereby securing said clamp to a respective said platform chassis.*

*12. A method of bridge assembly, said method comprising the steps of:*

*a) providing and installing first and second outer support beams over a land feature in spaced, parallel relation to each other and each having at least one flanged channel configured to receive the head of a bolt within the channel with the bolt shaft extending outwardly of the channel;*

*b) providing and attaching a plurality of platform chassis perpendicularly between said first and second outer support beams, said plurality of platform chassis each further including at least one longitudinally extending channel;*

*c) providing and attaching a plurality of platform members to said plurality of platform chassis with all of said plurality of platform members positioned in either one of a parallel or perpendicular orientation with respect to said first and second outer support beams, each said platform members including first and second outer walls each connected to a respective lower wall having an inwardly facing surface; and*

*d) providing and attaching a plurality of clamps to said plurality of platform chassis and securing said plurality of platform members to said plurality of platform chassis with said clamps, said plurality of clamps each having a main body portion and a finger portion with said main body portion attached to said platform chassis at the location of said at least one longitudinal channel and said finger portion attached to said inwardly facing surface of each said lower wall of a respective said platform member.*

* * * * *